United States Patent
Chang et al.

(10) Patent No.: US 7,333,148 B2
(45) Date of Patent: *Feb. 19, 2008

(54) DEPLOYABLE MONITORING DEVICE HAVING SELF-RIGHTING HOUSING AND ASSOCIATED METHOD

(75) Inventors: Yu-Wen Chang, Rancho Palos Verdes, CA (US); William Grainger, Temple City, CA (US); Michael Johnson, Yorba Linda, CA (US); William Traeger, Parrish, FL (US); Pablo De Los Rios, Arcadia, CA (US); William Osterholm, Moreno, CA (US)

(73) Assignee: Chang Industry, Inc., La Verne, CA (US)

(*) Notice: Subject to any disclaimer, the term of this patent is extended or adjusted under 35 U.S.C. 154(b) by 206 days.

This patent is subject to a terminal disclaimer.

(21) Appl. No.: 11/099,113

(22) Filed: Apr. 5, 2005

(65) Prior Publication Data

US 2005/0206729 A1    Sep. 22, 2005

Related U.S. Application Data

(63) Continuation of application No. 10/988,177, filed on Nov. 12, 2004, now Pat. No. 7,030,929, which is a continuation-in-part of application No. 09/903,462, filed on Jul. 11, 2001, now Pat. No. 6,831,699.

(51) Int. Cl.
*H04N 5/225* (2006.01)
(52) U.S. Cl. ..................................... 348/374
(58) Field of Classification Search .............. None
See application file for complete search history.

(56) References Cited

U.S. PATENT DOCUMENTS

| | | | |
|---|---|---|---|
| 2,441,133 A | 5/1948 | Brady | |
| 2,796,760 A | 6/1957 | Warlam | |
| 3,596,078 A | 7/1971 | Owens | |
| 3,611,277 A | 10/1971 | Yoder | |

(Continued)

FOREIGN PATENT DOCUMENTS

DE    296 16 709    * 6/1997

(Continued)

OTHER PUBLICATIONS

Boult et al., "Frame-rate Multi-body Tracking for Surveillance", DARPA Image Understanding Proceeding, 1998, USA XP002217332.

*Primary Examiner*—Nhon Diep
(74) *Attorney, Agent, or Firm*—Alston & Bird LLP

(57) ABSTRACT

A deployable monitoring device is provided comprising a self-righting housing having a video capturing device operably engaged therewith. The housing has a base and an opposed end disposed along an axis, with a center of gravity disposed about the base so as to be self-righting along the axis such that the housing, when righted, is supported by the base. The video capturing device is configured to capture video data of a scene external to the housing. The video data can be transmitted by a transceiver module to a station remotely disposed from the housing, so as to provide a remote visual depiction of the scene. An associated method is also provided.

58 Claims, 3 Drawing Sheets

U.S. PATENT DOCUMENTS

| | | |
|---|---|---|
| 3,704,764 A | 12/1972 | Henderson |
| 3,984,804 A | 10/1976 | Herring et al. |
| 4,109,757 A | 8/1978 | Hebberd |
| 4,142,179 A | 2/1979 | Lowndes |
| 4,365,557 A | 12/1982 | Couture et al. |
| 4,631,709 A | 12/1986 | Bender et al. |
| 4,651,834 A | 3/1987 | Eninger et al. |
| 4,722,282 A | 2/1988 | Synofzik et al. |
| 4,724,279 A * | 2/1988 | Ayscue ............... 174/38 |
| 4,739,302 A | 4/1988 | Kinard |
| 4,985,813 A | 1/1991 | Putman |
| 5,022,470 A | 6/1991 | Andersen et al. |
| 5,045,871 A | 9/1991 | Reinholdson |
| 5,070,790 A | 12/1991 | Le Parquier et al. |
| 5,169,354 A * | 12/1992 | Norton et al. ............... 446/241 |
| 5,339,281 A | 8/1994 | Narendra et al. |
| 5,406,287 A | 4/1995 | Pinkus |
| 5,414,444 A | 5/1995 | Britz |
| 5,481,904 A | 1/1996 | Fleck, Sr. et al. |
| 5,517,199 A * | 5/1996 | DiMattei ............... 342/357.09 |
| H1560 H | 7/1996 | Gill et al. |
| 5,597,335 A * | 1/1997 | Woodland ............... 441/36 |
| 5,654,692 A | 8/1997 | Baxter, Jr. et al. |
| 5,866,827 A | 2/1999 | Stewart et al. |
| 5,870,643 A | 2/1999 | Szajewski et al. |
| 6,259,373 B1 * | 7/2001 | Ghahramani ............... 340/815.4 |
| 6,373,521 B1 | 4/2002 | Carter |
| 6,442,240 B1 | 8/2002 | Otto |
| 6,642,906 B1 | 11/2003 | Machalek |
| 6,667,772 B1 * | 12/2003 | Oliver ............... 348/375 |
| 6,808,291 B1 | 10/2004 | Aylward et al. |
| 2003/0218540 A1 | 11/2003 | Cooper et al. |
| 2005/0024493 A1 | 2/2005 | Nam |

FOREIGN PATENT DOCUMENTS

| | | |
|---|---|---|
| EP | 0 522 200 B1 | 5/1998 |
| JP | 2004193916 A | 7/2004 |

* cited by examiner

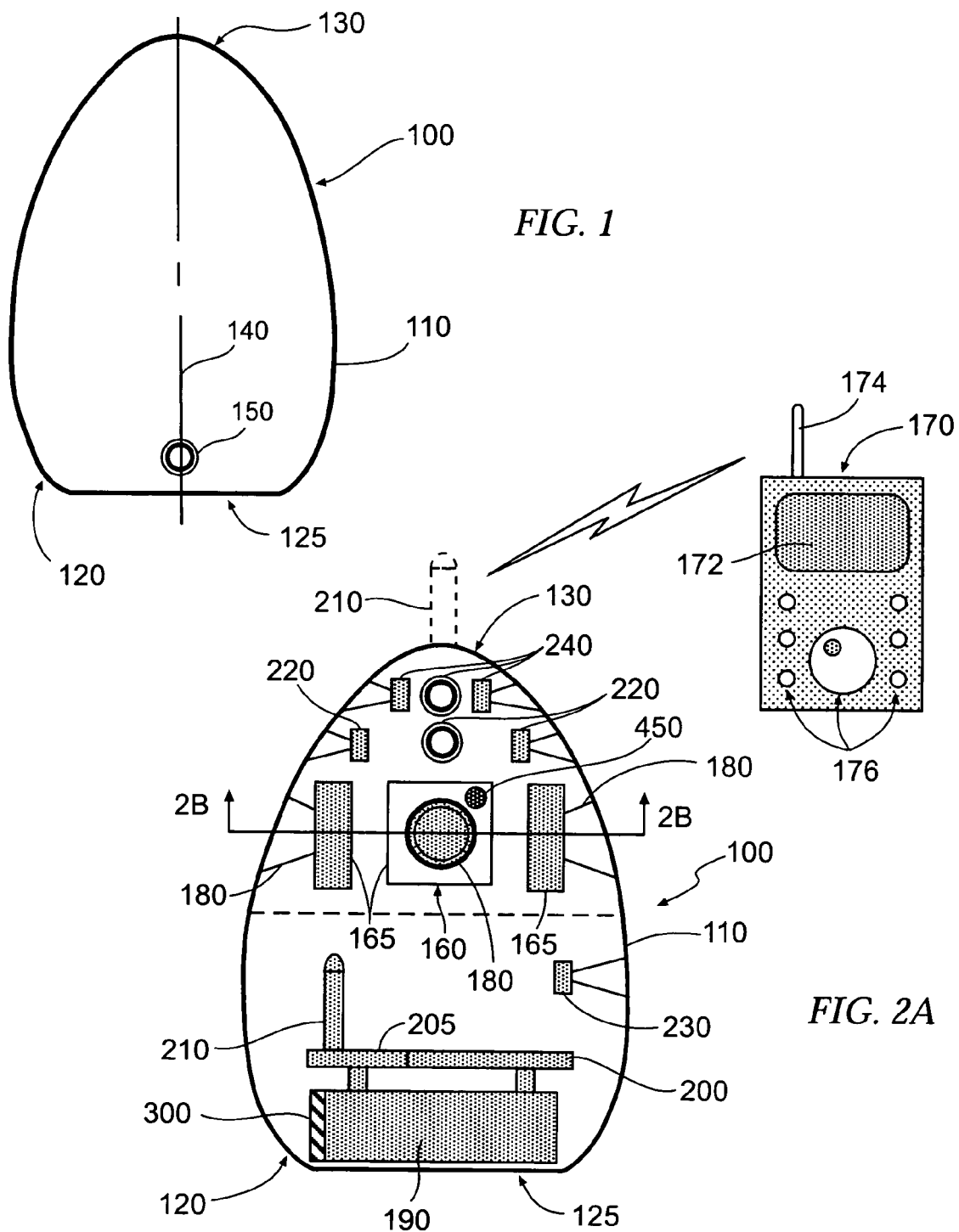

DEPLOYABLE MONITORING DEVICE HAVING SELF-RIGHTING HOUSING AND ASSOCIATED METHOD

CROSS-REFERENCES TO RELATED APPLICATIONS

This application is a continuation of U.S. patent application Ser. No. 10/988,177, filed on Nov. 12, 2004 now U.S. Pat. No. 7,030,929, which is a continuation-in-part of U.S. patent application Ser. No. 09/903,462, filed on Jul. 11, 2001, now U.S. Pat. No. 6,831,699, and which are hereby incorporated herein in their entirety by reference.

FIELD OF THE INVENTION

The present invention relates to surveillance equipment and, more particularly, to a deployable monitoring device having a self-righting housing and associated method.

BACKGROUND OF THE INVENTION

In certain situations, it may be highly desirable and advantageous to have a close-up view of a particular location or scene from the safety of a remote vantage point. For example, in a hostage situation or in a stand-off with a suspect barricaded in a building or compound, law enforcement officials must often rely on binoculars or other telescopic devices for visual monitoring of the scene. However, such visual devices are generally only useful where a clear line of sight and/or sufficient ambient light is available. Helicopters or other airborne devices may be useful in some situations, but the expense, difficult and limited deployment capabilities, obtrusiveness, and limited visual access associated with these airborne devices generally limits the effectiveness of these devices in such situations. In addition, alternate or supplemental monitoring capabilities may also be desirable, but limited by access to the scene. For example, aural monitoring may be performed by magnifying or "eavesdropper" microphones from a distant surveillance point. However, the effectiveness of such devices may be limited by extraneous noise therebetween. In other instances, chemical monitoring of the scene, for example, may also be advantageous so as to provide advanced warning of any noxious chemicals on the scene.

In many instances, the immediate and transient nature of these situations precludes the establishment of permanent monitoring provisions on the scene. For example, the aforementioned hostage or stand-off situations are instantaneous and unpredictable and may occur in a wide variety of sometimes-inaccessible locales. Other situations which present similar concerns may include, for example, industrial or otherwise inaccessible accident sites, remote areas where reports of poaching having been received, or areas where enemy troop movement or activity is suspected.

Thus, there exists a need for a monitoring device capable of allowing close-up visual monitoring of a scene from the safety of a vantage point disposed remotely from the scene. Such a monitoring device should desirably be portable, unobtrusive, and capable of being expediently deployed by various mechanisms, when and where necessary. The monitoring device should also be configured so as to be readily modified to provide enhanced monitoring capabilities such as, for example, aural and chemical monitoring. When deployed, the monitoring device should be sufficiently rugged to survive the deployment thereof in proper working order, while also being capable of withstanding the environment at the scene. Such a monitoring device should also desirably provide a 360 degree field of view of the immediate scene around the device. In some instances, it may also be advantageous for functions of the monitoring device to be configured so as to be controllable from the remotely disposed station.

SUMMARY OF THE INVENTION

The above and other needs are met by the present invention which, in one embodiment, provides a deployable monitoring device comprising a self-righting housing having a video capturing device operably engaged therewith. The housing has a base and an opposed end disposed along an axis. The housing is further configured to have a center of gravity disposed about the base so as to be self-righting along the axis such that the housing, when righted, is supported by the base. The video capturing device is operably engaged with the housing and is configured to capture video data of a scene external to the housing. In some instances, the video data of the scene may be transmitted by a transceiver module to a station disposed remotely from the housing and configured to process the video data so as to provide a remote visual depiction of the scene.

Another advantageous aspect of the present invention comprises a method of viewing a scene from a station disposed remotely thereto. According to one embodiment of the present invention, a monitoring device comprises a video capturing device having a transceiver module operably engaged therewith, wherein the video capturing device and the transceiver module are disposed within a self-righting housing. The transceiver module may send the video data to the remote station via a wireless communication link. Accordingly, the monitoring device is first deployed to the scene, wherein video data of the scene is then received at the remotely disposed station from the video capturing device, via the transceiver module, to thereby provide a remote visual depiction of the scene.

Thus, embodiments of the present invention provide a monitoring device capable of allowing close-up visual monitoring of a scene from the safety of a station disposed remotely from the scene, wherein the monitoring device is portable, unobtrusive, and can be expediently deployed by various mechanisms, when and where necessary. In some instances, embodiments of the present invention also provide a spatial orientation in conjunction with the video data of the scene so as to allow a viewer to spatially orient the scene with respect to the housing. Embodiments of the invention may further provide a self-righting housing with one or more video capturing devices disposed therein. Such a monitoring device attains an advantageous upright orientation upon deployment to thereby allow the one or more video capturing devices to provide a 360 degree field of view of the immediate scene around the device to the remotely disposed monitoring station, wherein multiple video capturing devices may be selectively, simultaneously, or sequentially actuated. Further embodiments of the monitoring device are configured so as to be readily modified to provide enhanced monitoring capabilities such as, for example, aural and chemical monitoring. In addition, some embodiments of the monitoring device may also include, for example, a light source for illuminating the scene, a motion sensor for detecting motion within the scene, an audio sensor for providing aural monitoring of the scene, and a chemical sensor for providing chemical monitoring of the scene, as well as a deterrent device and/or a distraction device. When deployed, the monitoring device is configured to be sufficiently rugged to survive the deployment in proper working order, as well as capable of withstanding the environment at the scene. In some instances, functions of the monitoring device are advantageously configured to be controllable from the remotely disposed station.

BRIEF DESCRIPTION OF THE DRAWINGS

Figure 2B:
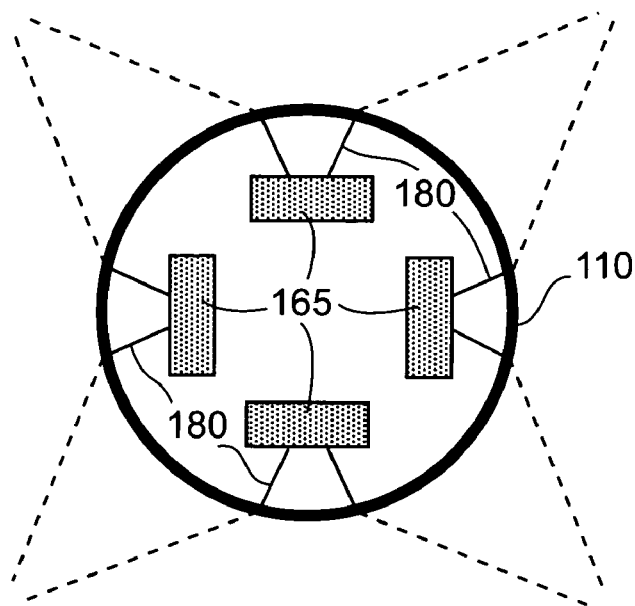
Figure 3:
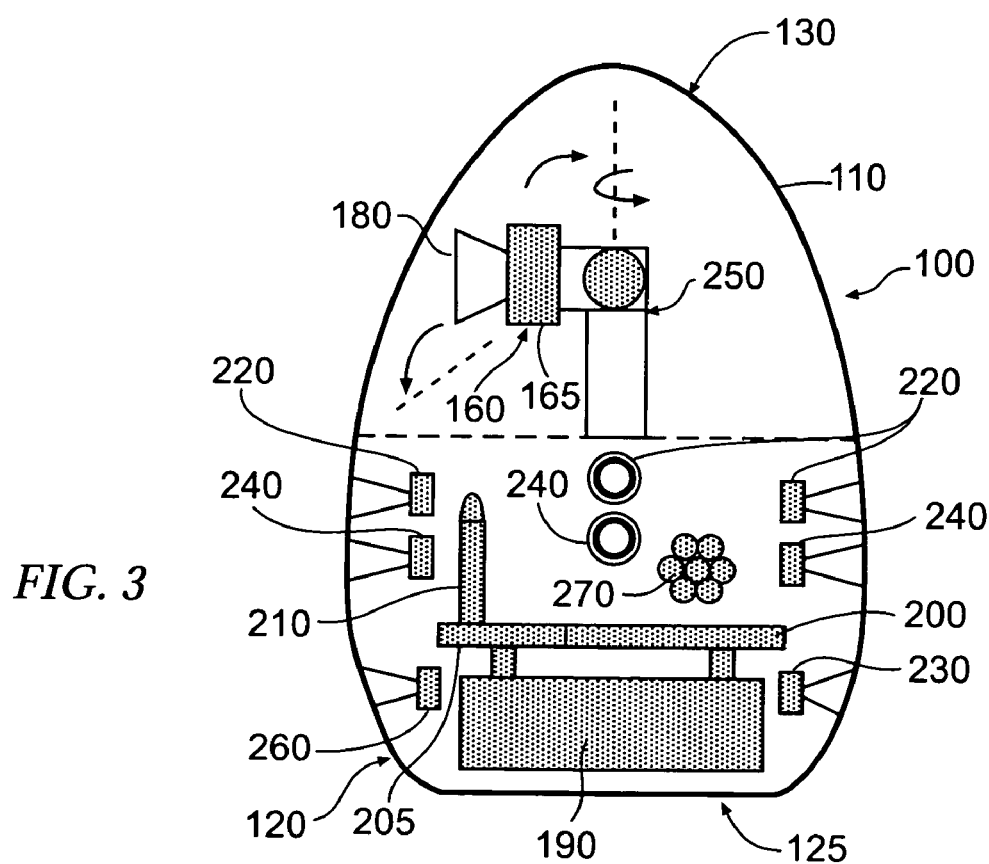
Figure 4A:
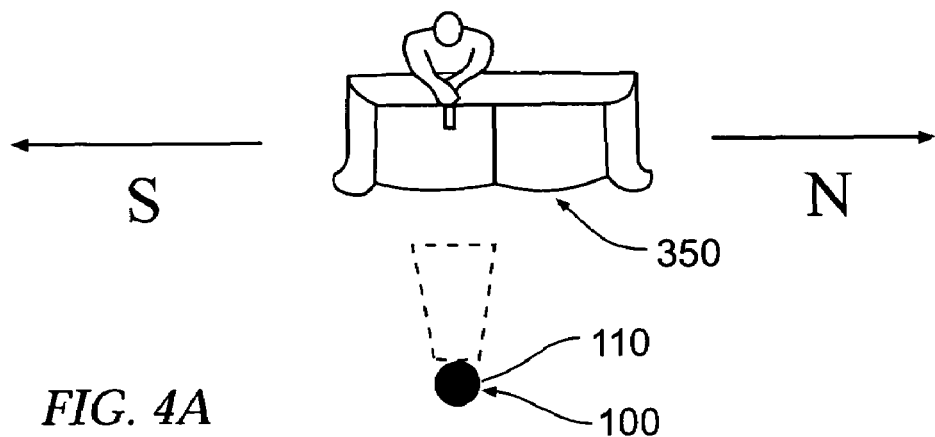

Having thus described the invention in general terms, reference will now be made to the accompanying drawings, which are not necessarily drawn to scale, and wherein:

FIG. 1 is a schematic representation of a self-righting housing according to one embodiment of the present invention;

FIG. 2A is a schematic cut-away representation of a deployable monitoring device according to one embodiment of the present invention having a self-righting housing and configured to communicate with a remote station;

FIG. 2B is a cross-sectional view of a deployable monitoring device, taken along line 2B-2B of FIG. 2A, showing the field of view of the video capturing devices contained therein according to one embodiment of the present invention;

FIG. 3 is a schematic cut-away representation of a deployable monitoring device according to an alternate embodiment of the present invention;

FIG. 4A is a schematic plan view of an exemplary scene; and

Figure 4B:
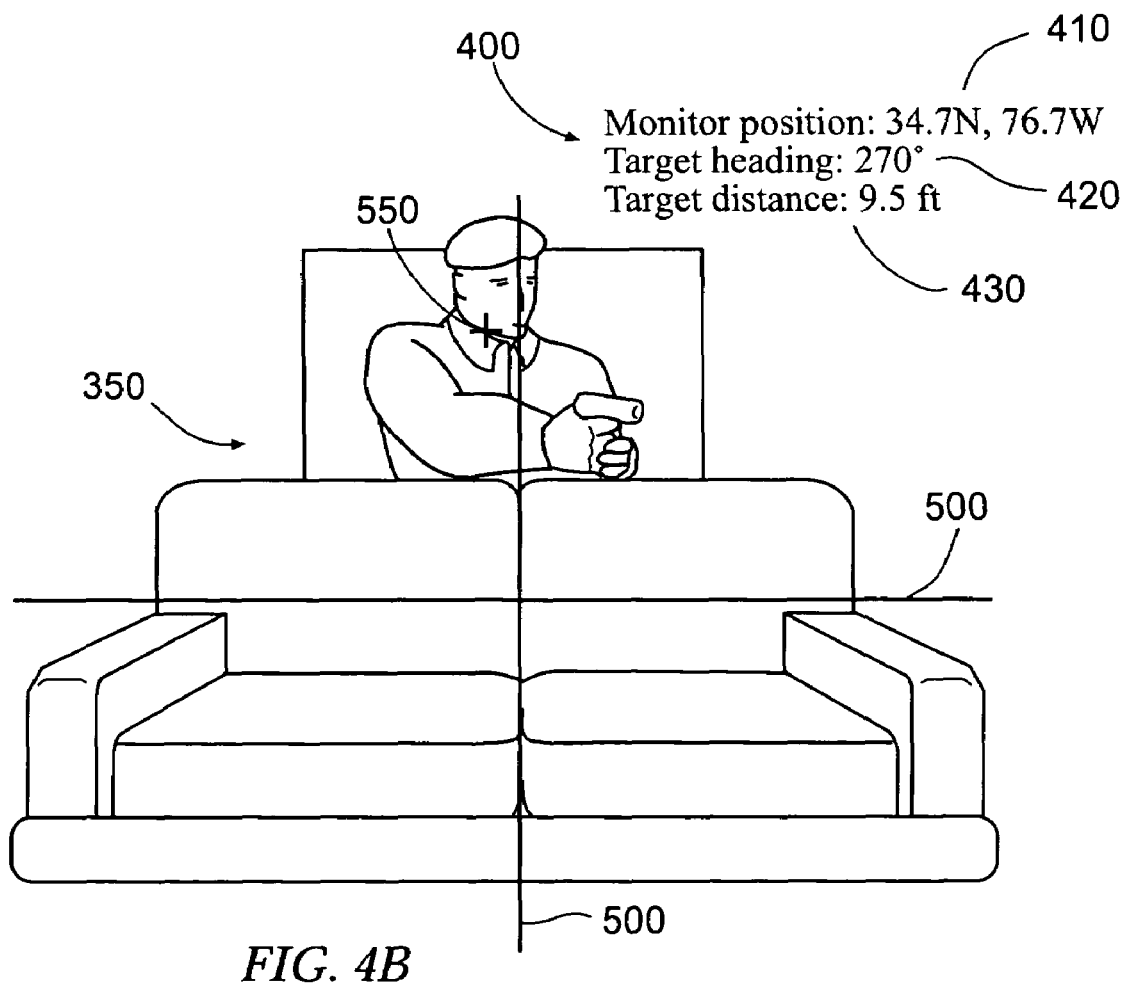

FIG. 4B is a schematic lateral view of an exemplary scene, corresponding to the plan view shown in FIG. 4A, captured by a video capturing device associated with a deployable monitoring device according to one embodiment of the present invention and having a spatial orientation associated therewith.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 schematically illustrates one embodiment of a deployable monitoring device according to the present invention, the device being generally indicated by the numeral 100. According to one advantageous embodiment of the present invention, the device 100 is configured so as to be self-righting upon deployment. Accordingly, the device 100 includes a housing 110 which, in one instance, is ovately shaped with a relatively wide base 120 and an opposed end 130 disposed along an axis 140. The center of gravity 150 is also advantageously disposed along the axis 140 toward the base 120 such that the housing 110 is self-righting about the base 120. The center of gravity 150 may be established in the desired position through, for example, weighted construction of the housing 110 to shift weight toward the base 120 or distribution of the contents within the housing 110 such that heavier components are disposed toward the base 120. The base 120 may also include a flat portion 125 centered about the axis 140 so as to facilitate the stability of the housing 110 in the self-righted position, wherein the opposed end 130 is disposed generally above the base 120. In addition, there may be instances where the device 100 also includes an actuatable self-righting mechanism (not shown), disposed within or externally to the housing 110. Such a self-righting mechanism would facilitate righting of the housing 110 when the self-righting configuration is ineffective, such as, for example, when the device 100 is deployed on a slope or where the device 100 lands on a soft or conforming surface.

Another advantageous aspect of the present invention relates to the deployability of the device 100. The device 100 is configured so as to be deployed by, for example, being thrown by an individual, dropped from above such as from a roof or from a plane, or propelled from a launching device such as a launching gun, a grenade launcher, or an operably engaged rocket device. For facilitating such deployment, the device 100 may also include, for example, a parachute device for controlling the descent rate and impact forces experienced by the device 100. It will be understood, however, that there are many ways of deploying a portable device as described herein which will be appreciated by one skilled in the art. Accordingly, the housing 110 is scalable and constructed to have the properties necessary for withstanding the conditions of deployment. For example, the housing 110 should be strong and impact resistant and may be constructed from materials such as a suitable polymer, a composite material, or a lightweight alloy such as a titanium alloy. In some instances, the housing 110 may be constructed in two parts such that the base 120 and the opposed end 130 are separably engaged. In such instances, the portion of the housing 110 including the base 120 may be comprised of, for example, aluminum, an aluminum alloy, or steel so as to provide strength and weight for shifting the center of gravity 150 toward the base 120. It will thus be appreciated by one skilled in the art that the housing 110 may be appropriately constructed according to the requirements of the particular application. For example, the device 100 and/or housing 110 may be constructed so as to be water resistant, waterproof, capable of withstanding extreme temperature ranges, chemically resistant, fire resistant, impact or shock resistant, abrasion resistant, capable of withstanding extreme gravitational forces, or the like.

As schematically shown in FIG. 2A, one particularly advantageous embodiment of the present invention comprises a deployable device 100 having a self-righting housing 110 configured to house a video capturing device 160 so as to facilitate remote video monitoring and surveillance of a scene at a station 170 disposed apart from the device 100. In situations such as, for example, a hostage situation or a stand-off with a suspect barricaded in a building or compound, the device 100 may be thrown or otherwise deployed and delivered to within close proximity of a strategic site (otherwise referred to herein as a "scene"). Once actuated, the device allows law enforcement officials or other personnel to monitor the scene from the safety of a position remote from the scene through an appropriate station 170. Thus, visual access to and surveillance of the scene is facilitated where access is otherwise impracticable. Accordingly, it will be understood that the device 100 may be applicable to many different situations requiring remote and/or unobtrusive visual monitoring, within the spirit and scope of the present invention. For example, the device 100 may be configured to be waterborne so as to monitor wave height and/or current conditions during a hurricane or the condition of floor underlying the body of water. In other instances, the device 100 may be deployed to remote wilderness areas to allow monitoring for poachers. Additionally anticipated is, for example, deployment of a device 100 to a hazardous environment site that is otherwise unsafe for human access. Still, too, such a device 100 could be used in instances of, for example, building collapse during an earthquake to monitor for survivors in unstable or inaccessible areas.

As further shown in FIG. 2A, the device 100 may comprise one or more video capturing devices 160 such as, for example, a small CMOS or CCD camera module 165, mounted with respect to the housing 110 and configured to capture video data of the scene through the housing 110. The video capturing device 160 may also further comprise a lens member 180 operably engaged with the camera module 165 so as to facilitate capturing of the video data therethrough and/or over a predefined field of view. In some instances, the housing 110 may be at least partially translucent such that the video data is captured through the housing 110. In other instances, an appropriate orifice (not shown) may be formed through the housing 110, wherein the lens member 180 or the camera module 165 itself is engaged with the orifice so as to directly capture the video data of the scene. The camera module 165 and associated lens member 180, as with any other component disposed within the housing 110, are also configured with the properties required of the housing 110 for the anticipated application. For example, the camera module 165 and the lens member 180 are configured to be shock and impact resistant, waterproof, and capable of withstanding extreme gravitational forces where such properties are required for the housing 110. In addition, the video capturing devices 160 may be further configured with accessories necessary for effective operation thereof such as, for instance, mechanical or electronic focus mechanisms. Note that CMOS and CCD camera modules 165 with associated lenses 180 are merely examples of the video capturing devices 160 which may be utilized within the present invention and that many other types of video capturing devices 160 may be applied where and when appropriate in accordance with the spirit and scope of the present invention.

In some embodiments of the present invention, the device 100 includes one or more video capturing devices 160, as described above, disposed about the housing 110 so as to provide, for example, a 360 degree visual monitoring field of view around the housing 110. As schematically shown in FIG. 2B, for example, four video capturing devices 160 may be disposed at 90 degree intervals, with each video capturing device 160 being configured to cover about a 90 degree field of view at a certain distance from the housing 110. Accordingly, the video capturing devices 160 may be fewer in number, if each is configured to cover a larger field of view, or greater in number if, for example, each is configured to cover a smaller field of view or if overlap in the fields of view of the video capturing devices 160 is desired. Further, it will be understood that the video capturing devices 160 may be, for instance, concurrently actuated, selectively actuated, or sequentially actuated to provide the necessary or desired visual monitoring of the scene external to the housing 110.

Once deployed, the device 100 may land or otherwise become positioned in many different orientations. That is, the one or more video capturing devices 160 may be pointed in different directions, wherein a viewer of the captured video data may not necessarily be aware of the spatial orientation of the scene, or any objects disposed therein, about the device 100. That is, anyone viewing the captured video data may not have an external reference with which to associate a position or direction of the scene, or objects therein, with respect to the device 100. Accordingly, some embodiments of the present invention may include a spatial orientation device 300 (as shown in FIG. 2A) disposed within the housing 110, wherein such a spatial orientation device 300 is configured to be capable of associating a spatial orientation with the video data captured by the video capturing device(s) 160. The spatial orientation device 300 may comprise, for example, a Global Positioning System (GPS) device or a compass device. In this manner, the spatial orientation device 300 may associate, for example, geodetic data with the housing 110 and/or the scene, or a compass heading or direction of the scene with respect to the housing 110. One such example is shown in FIGS. 4A and 4B.

FIG. 4A illustrates one example whereby the deployed device 100 captures video data of a target (i.e., a couch or a gunman) 350 and, in this instance, the video capturing device 160 is disposed easterly of the target 350 and directed in a westerly direction (i.e., 270°). As such, when the video data of the target 350 is captured, the video data produces a lateral depiction of the scene (i.e., the "picture" captured by the video capturing device 160). As shown in FIG. 4B, the lateral depiction shows a picture of the target 350, as well as spatial orientation data 400 associated with the scene and/or in relation to the device 100. The spatial orientation data 400 may be provided in a text format or, in some instances, may be provided in a graphical or audio format, where appropriate or desired, and provided in addition to or in the alternative to the text format. Such spatial orientation data 400 may include, for example, the position 410 of the device 100, the compass direction or heading 420 of the target 350 with respect to the housing 110, and the range or distance 430 of the target 350 with respect to the housing 110. The position 410 may be determined, for example, by a GPS device, while the direction may be determined, for instance, by a GPS device or compass device. The range may be determined, for example, by a range-determining device 450 (as shown in FIG. 2A) associated, for instance, with the housing 110 and/or the video capturing device(s) 160. Such a range-determining device 450 may comprise, for example, a laser range finder, a sonar device, or any other suitable device, as will be appreciated by one skilled in the art.

In some embodiments, the device 100 may also comprise a cross-hair generator (not shown) operably engaged with the video capturing device(s) 160 and configured to be capable of associating a cross-hair indicator 500 (as shown in FIG. 4B) with the captured video data of the scene. Accordingly, the cross-hair indicator 500 is associated with the scene so as to provide an indication of the direction and/or aim of the particular video capturing device 160 with respect to the scene. In some instances, the cross-hair indicator 500 may be generated so as to be stationary in correspondence with the aim of the particular video capturing device 160. However, in other instances, the cross-hair indicator 500 may be movable with respect to the scene. In still other instances, the cross-hair generator may be capable of generating a cursor-type cross-hair 550 that may be movable with respect to the scene. Such a cursor-type cross-hair 550 may be beneficial, for example, in selecting an object with the scene for which spatial orientation is desired. For instance, upon the cursor-type cross-hair 550 being moved to select an object with the scene, the GPS device and/or compass device (spatial orientation device 300) can determine the heading or direction of the object with respect to the housing 110, while the range-determining device 450 can determine the distance of the object from the housing 110. The GPS device can then be implemented to determine the geodetic coordinates of the object. Such geodetic coordinates can then be used, for example, to guide munitions, to plan a strike, to monitor movement of the object, or for other functions.

Due to the electronic configuration of the video monitoring devices 160, associated power and control equipment are generally required to be in operable engagement with the video capturing devices 160 within the housing 110. Accordingly, as shown in FIG. 2A, the device 100 may further comprise a power source 190, control circuitry 200, and an antenna 210. Note that the operative connections between the various components within the housing 110 have been omitted in FIG. 2A (and FIG. 3) for clarity, but any operative engagement described herein will be understood to comprise the necessary connections for proper operation of the specified components. The power source 190 may comprise, for example, an appropriate battery, which may be single-use or rechargeable, while having the necessary amp-hour rating for the application. Generally, the power source 190 is disposed toward the base 120 so as to add weight for shifting the center of gravity 150 toward the base 120. The control circuitry 200 is operably engaged with the power source 190 and configured to provide local control over at least the video capturing devices 160. The control circuitry 200 may further comprise a transceiver module 205 interfaced with the antenna 210, wherein the antenna 210 may disposed internally within the housing 110 or externally of the housing 110 as shown in phantom in FIG. 2A. The transceiver module 205 facilitates the transmission of the captured video data of the scene, via the antenna 210, to the station 170 disposed remotely from the device 100. In some instances, the transceiver module 205 may also receive control commands for components within the device 100 from the station 170, via the antenna 210. Generally, communication between the device 100 and the station 170 is accomplished via a wireless link though, in some instances, a wireline link may be appropriate and is thus considered to be within the scope of the invention.

The station 170 may comprise, for example, a portable hand-held device with a viewable screen 172, wherein the hand-held device includes a transceiver (not shown) with an antenna 174 in communication therewith. In some instances, the station is configured to receive the video data and associated spatial orientation data 400 from the device 100 via the antenna 174 and the transceiver, and to process the video data and spatial orientation data 400 so as to provide a spatially-oriented visual representation of the scene on the screen 172. In other instances, the station 170 may include various controls 176 for remotely controlling aspects of the device 100. For example, the station may be configured to selectively power on and off the control circuitry 200 and/or the video capturing devices 160 by directing selective engagement of the power source 190. In other instances, the station 170 may be configured to control the focus of each video capturing device 160.

The device 100 may still further include other components for enhancing operation thereof for the particular application or providing the capability of gathering additional information about the scene. For example, the device 100 may include one or more light sources 220 for illuminating the scene for the video capturing devices 160. In some instances, one or more of the light sources 220 may comprise a bright strobe light or the like for blinding or otherwise distracting someone on the scene and in the vicinity of the device 100. Note also that at least one of the light sources 220 may provide light in, for example, the infrared or other light spectrum. In such instances, the video capturing devices 160 may also be configured so as to capture video data in the infrared spectrum so as to provide thermal imaging or night vision capabilities. In other instances, the CMOS and/or CCD camera modules 165 may, for example, be capable of capturing video data in darkness conditions where the scene is illuminated with an infrared light illuminator, such as an infrared LED, providing illumination near the infrared spectrum. FIG. 2A shows one example where four light sources 220 are provided, each light source 220 corresponding to one of the video capturing devices 160, though the number, disposition, and type of light source 220 used in the device 100 may vary according to the particular application. Such light sources 220 may be operably engaged with the control circuitry 200 so as to allow remote control thereof from the station 170, or the device 100 may be configured to selectively actuate the light sources 220 when certain lighting conditions exist at the scene or when the corresponding video capturing device 160 is actuated.

Still further, the device 100 may include an audio monitoring device 230 for providing aural data from the scene. Such an audio monitoring device 230 may comprise, for example, an audio microphone or the like operably engaged with the control circuitry 200 so as to transmit the aural data via the transceiver module 205 to the remote station 170. The audio monitoring device 230 may, in some instances, be controlled from the station 170, with respect to on/off commands or adjusting the gain of the audio monitoring device 230 according to the sound levels at the scene. In some instances, the audio monitoring device 230 may incorporate an audio emitting device (not shown) for emitting audio content such as loud noises for distraction purposes or to provide a method for personnel manning the station 170 to verbally communicate with persons at the scene. In addition, since each additional component within the device 100 may increase the power consumption from the power source 190, conservation and careful meting of the available power is an important consideration. As such, any unnecessary power consumption may be restricted by, for example, turning off certain components until the device 100 has been deployed or until the conditions at the scene require the use of those components. Such power conservation may be controlled from the station 170 or the device 100 may include, for example, sensing devices 240 such as motion sensing devices known to one skilled in the art. Such sensing devices 240 may be implemented in a variety of manners, for example, by being operably engaged with individual video capturing devices 160 or audio monitoring devices 230, or by being configured to operably engage the control circuitry 200, for controlling the on/off operation of individual components up to substantially the entire device 100.

FIG. 3 schematically illustrates an alternate embodiment of the present invention, wherein the device 100 includes a single video capturing device 160 disposed within the housing 110 and operably engaged with a pan-tilt mechanism 250 (otherwise referred to herein as a "gimbal mechanism"). Accordingly, the housing 110 is configured to be at least partially translucent for allowing the video capturing device 160 to capture video data of the scene therethrough. The pan-tilt mechanism 250 allows the video capturing device 160 to be rotated about the axis 140, for example, for a full 360 degrees while also allowing the video capturing device 160 to be tilted from, for instance, about 30 degrees below the horizontal to about 90 degrees above the horizontal. In some instances, the pan-tilt mechanism 250 may allow the video capturing device 160 to tilt through 90 degrees above the horizontal and continue to about 30 degrees below the horizontal in opposing relation to the starting position. Such a configuration may allow the device 100 to provide visual monitoring of the scene in instances where, for example, the device 100 has not achieved a full upright orientation upon deployment. The pan-tilt mechanism 250 may further be, for example, remotely controlled from the station 170 via a wireless link through the transceiver module 205 or automatically controlled by the sensing devices 240 as previously discussed, while being configured to be consistent with the power conservation scheme implemented for the device 100. Note that a similar function to the pan-tilt mechanism 250 may be at least partially achieved in embodiments having fixed video capturing devices 160 by providing lens members 180 with sufficiently wide fields of view so as to be at least partially capable of capturing video data of the scene where the housing 110 does not completely achieve an upright position upon deployment.

The embodiment illustrated in FIG. 3 shows that the device 100 may comprise even more additional components such as, for example, a chemical sensor 260 configured to be sensitive to certain noxious chemicals. The chemical sensor 260 may further operably engage the control circuitry 200 so as to be communicable with the station 170 to transmit chemical monitoring data thereto. Such functionality would allow the chemical status of, for instance, an accident scene to be remotely monitored to determine whether a hazardous material situation is present before dispatching rescue personnel to the area or, as a further example, to chemically monitor the site of a drug transaction so as to determine the presence of illegal substances, wherein this information may be later applicable as evidence in legal proceedings. Further, since a device 100 as described herein may be used in tactical or other sensitive situations where it is desired that the device 100 not be taken into possession of the persons being monitored, the device 100 may also include a self-destruction device 270 capable of disabling or destroying the device 100. Such a self-destruction device 270 may be triggered through, for example, a command initiated at the station 170 and received through the transceiver module 205, or through a sensing device (not shown) engaged therewith for triggering the self-destruction device 270 upon detecting touch, motion in the scene, movement of the housing 110, or the like and as will be appreciated by one skilled in the art as being within the spirit and scope of the present invention. Note that, in alternate embodiments, the self-destruction device 270 may be replaced with a smoke bomb, tear gas charge, or other like device for creating a distraction or deterrent at the scene.

While having described a deployable monitoring device 100 having the characteristics, functions, features, and applications as described herein, it will be apparent to one skilled in the art that the deployable monitoring device 100 may have one or more methods of use associated therewith. For example, one method involves deploying the monitoring device 100 having a video capturing device 160 to a scene. Thereafter, video data captured by the video capturing device 160 and associated spatial orientation data 400 captured by the spatial orientation device 300 and/or range-determining device 450, is received at a remotely disposed station 170 so as to provide a spatially-oriented remote visual depiction of the scene. Thus, it will be understood that the various additional components associated with or capable of being incorporated into the device 100 as described herein may be incorporated into the example method according to the corresponding function of each component as will be understood by one skilled in the art. One skilled in the art will also appreciate that, in some instances, the described method may lend itself to automation, and, therefore, associated computer devices and computer software program products may be devised for accomplishing one or more of the functions of a deployable monitoring device as detailed herein.

Thus, embodiments of the present invention provide a monitoring device capable of allowing close-up visual monitoring of a scene from the safety of a vantage point disposed remotely from the scene. Such a monitoring device may be advantageously scaled or otherwise adapted to be portable, unobtrusive, and capable of being expediently deployed by various mechanisms, when and where necessary. Embodiments of the monitoring device may also be configured so as to be readily modified to provide enhanced monitoring capabilities such as, for example, aural, chemical, and seismic monitoring of the remote scene. Such a monitoring device may also include monitoring as well as offensive measures for tactical or otherwise sensitive deployment. The monitoring device is further constructed to be sufficiently rugged, both with respect to the housing and the components therein, to survive deployment in proper working order, while also being capable of withstanding the environment at the scene. Such a monitoring device is also capable of providing a 360 degree field of view of the immediate scene around the device 100, including providing spatial orientation data 400 so as to spatially orient the scene with respect to the device 100, in some cases even when the device does not fully right upon deployment or the device is deployed in low light or even total darkness conditions. In some instances, the monitoring device may also be advantageously configured such that functions of the monitoring device may be controlled from the remotely disposed station. Embodiments of the monitoring device may also incorporate power conservation measures in instances of prolonged deployment or where relatively high power consumption components are utilized within the device.

Many modifications and other embodiments of the invention will come to mind to one skilled in the art to which this invention pertains having the benefit of the teachings presented in the foregoing descriptions and the associated drawings. For example, the device 100 may include further components such as a seismic sensor for monitoring seismic activity at the scene. The device 100 could also be configured to be mounted on a pole of other extension for providing monitoring from a higher vantage point. The device 100 may also be suspended by a rope, string or other tether device, wherein the tether may also be used to retrieve the device 100 in instances where the device 100 is thrown or otherwise deployed to the scene.

In other instances, the device 100 may be provided with a distraction device (not shown) operably engaged with the housing 110 and configured to be selectively actuatable (i.e., remotely from the station 170 or through a actuation sensor (not shown) engaged therewith) so as to introduce a distraction associated with the device 100 into the scene. For example, such a distraction device may comprise, for example, a noise emitter, a smoke emitter, an odor emitter, or a light emitter. One skilled in the art will appreciate that such a distraction device may configured in many different manners and that the possible variants are provided for example only and are not intended to be limiting. For instance, the light emitter may be a bright strobe light or the like for blinding or otherwise distracting someone on the scene and in the vicinity of the device 100. Likewise, the noise emitter may comprise, for example, a compressed air source configured to release the air through an orifice so as to produce a high pitched whistle. In addition, the smoke device may comprise a smoke bomb, and the odor emitter may comprise a tear gas charge or the like.

The device 100 may also comprise a deterrent device (not shown), also configured to be selectively actuatable so as to deter contact with the device 100 or housing thereof. Such a deterrent device may comprise, for example, an electric shock device capable of imparting an electric shock to a person touching the housing 110. The deterrent device may also comprise a noise emitter, a smoke emitter, or a light emitter, as previously described with respect to the distraction device. However, the deterrent device may also comprise, for example, a liquid emitter or a gas emitter configured to emit a suitable substance for deterring contact with the housing 110. In some instances, the emitted substance may be configured so as to overcome or otherwise disable persons or other animals present about the device 100. Accordingly, the deterrent device may also be configured in many different manners as will be appreciated by one skilled in the art.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A deployable monitoring device comprising:
   an at least partially arcuate housing having a base and an opposed end disposed along an axis, the housing being configured to have a center of gravity disposed about the base so as to be self-righting along the axis such that the housing, when deployed to a deployment medium, self-rights and is independently supported by the base directly with respect to the deployment medium; and
   a video capturing device operably engaged with the housing and configured to capture video data of a scene external to the housing.

2. A device according to claim 1 further comprising a transceiver module disposed within the housing and operably engaged with the video capturing device, the transceiver module being adapted to transmit the video data of the scene to a station disposed remotely from the scene, the station being configured to process the video data so as to provide a visual depiction of the scene.

3. A device according to claim 1 wherein the base further comprises a planar portion having the axis perpendicular thereto so as to facilitate stabilization of the housing about the base upon self-righting of the housing such that the housing is supported by the planar portion directly with respect to the deployment medium.

4. A device according to claim 1 further comprising a power source disposed within the housing and operably engaged with the video capturing device.

5. A device according to claim 1 wherein the video capturing device comprises a video capture module configured to capture video data through a lens member in communication therewith.

6. A device according to claim 5 wherein the video capture module and the lens member are disposed within the housing and the housing is configured such that the video capture module is capable of capturing video data of the scene through the housing via the lens member.

7. A device according to claim 6 wherein the housing is at least partially translucent so as to allow the lens member to receive video data of the scene therethrough.

8. A device according to claim 5 wherein the video capture module is disposed within the housing and the lens member is at least partially disposed in an orifice defined by the housing such that the video capture module is capable of capturing video data of the scene via the lens member.

9. A device according to claim 1 wherein the video capturing device comprises at least one of a complementary metal-oxide semiconductor (CMOS) camera and a charge coupled device (CCD) camera.

10. A device according to claim 1 wherein the video capturing device is configured to be responsive to at least one of visible light and infrared light.

11. A device according to claim 1 further comprising a light source operably engaged with the housing and configured to illuminate the scene.

12. A device according to claim 1 wherein the video capturing device is configured to automatically focus on the scene.

13. A device according to claim 2 wherein the video capturing device is configured to be manually focused and is responsive to a focus command from the remotely disposed station received via the transceiver module.

14. A device according to claim 1 further comprising a motion sensor device operably engaged with the video capturing device for actuating the video capturing device to capture video data upon detection of a motion in the scene.

15. A device according to claim 2 further comprising an audio sensor operably engaged with the transceiver module and configured to capture audio data from the scene, wherein the transceiver module is further adapted to transmit the audio data from the scene to the remotely disposed station so as to provide remote audio monitoring of the scene.

16. A device according to claim 2 further comprising a chemical sensor operably engaged with the transceiver module and configured to capture chemical composition data from the scene, wherein the transceiver module is further adapted to transmit the chemical composition data from the scene to the remotely disposed station so as to provide remote chemical monitoring of the scene.

17. A device according to claim 2 further comprising a self-destruction device operably engaged with the transceiver module and configured to destroy the monitoring device, the self-destruction device being further configured to be at least one of automatically activated and manually activated in response to a destruct command from the remotely disposed station received via the transceiver module.

18. A device according to claim 2 further comprising a gimbal mechanism operably engaged between the video capturing device and the housing, the gimbal mechanism being configured to at least one of pan, tilt, and rotate the video capturing device.

19. A device according to claim 18 wherein the gimbal mechanism is configured to rotate the video capturing device about the axis.

20. A device according to claim 19 wherein the gimbal mechanism is further configured to tilt the video capturing device over a range of between about 30 degrees below a horizontal plane and about 90 degrees above the horizontal plane.

21. A device according to claim 18 wherein the gimbal mechanism is operably engaged with the transceiver module and is responsive to a movement command from the remotely disposed station received via the transceiver module.

22. A device according to claim 18 further comprising a motion sensor device operably engaged with the gimbal mechanism, the gimbal mechanism being responsive to the motion sensor device to pan and tilt the video capturing device such that video data is captured where a motion is detected in the scene.

23. A device according to claim 2 further comprising a plurality of video capturing devices operably engaging the transceiver module, each video capturing device being configured to capture video data over an angular field of view, wherein the plurality of video capturing devices are disposed within the housing and configured so as to capture video data over a 360 degree field of view about the housing.

24. A device according to claim 23 wherein each video capturing device is configured to capture video data over about a 90 degree field of view and the plurality of video capturing devices is configured to be at least one of selectively actuatable, simultaneously actuatable, and sequentially actuatable.

25. A device according to claim 2 further comprising an antenna operably engaged with the transceiver module and adapted to facilitate wireless communication between the transceiver module and the remotely disposed station.

26. A device according to claim 1 further comprising a tether operably engaged with the housing and configured to allow at least one of retrieval of the housing, movement of the housing, and positional adjustment of the housing following deployment of the monitoring device.

27. A device according to claim 1 further comprising a sound source operably engaged with the housing and configured to emit sound.

28. A device according to claim 1 further comprising an elongate member having a first end configured to be operably engaged with the housing and an opposing second end adapted to be held by an operator, the elongate member being configured to remotely support the housing, via the second end thereof, at a distance from the second end.

29. A device according to claim 1 further comprising a spatial orientation device operably engaged with the video capturing device and configured to cooperate therewith so as to associate a spatial orientation with the captured video data and thereby spatially orient the scene with respect to the video capturing device and the housing.

30. A device according to claim 29 wherein the spatial orientation device further comprises at least one of a Global Positioning System (GPS) device and a compass device.

31. A device according to claim 29 wherein the spatial orientation device is further configured to at least one of associate geodetic data regarding the housing with the captured video data and associate a compass heading of the scene, with respect to the housing, with the captured video data.

32. A device according to claim 29 wherein the spatial orientation further comprises at least one of a position, a degree heading with respect to a compass, and a compass heading.

33. A device according to claim 1 further comprising a cross-hair generator operably engaged with the video capturing device and configured to cooperate therewith so as to associate a cross-hair indicator with the captured video data to thereby orient the scene with respect to the video capturing device.

34. A device according to claim 1 further comprising a range-determining device operably engaged with the video capturing device and configured to cooperate therewith so as to associate a distance of an object within the scene, from the housing, with the captured video data.

35. A method of viewing a scene from a station disposed remotely thereto, said method comprising:
deploying a monitoring device to a deployment medium at the scene, the monitoring device comprising a video capturing device and a transceiver module operably engaged with and disposed within a self-righting and at least partially arcuate housing, the housing having a center of gravity disposed about a base thereof, such that the housing self-rights and is independently supported by the base directly with respect to the deployment medium; and
receiving video data of the scene at the remotely disposed station from the video capturing device, via the transceiver module, the video data thereby providing a remote visual depiction of the scene.

36. A method according to claim 35 further comprising establishing a wireless communication link with the monitoring device via the transceiver module prior to receiving video data of the scene.

37. A method according to claim 35 wherein the monitoring device further comprises a power source operably engaging at least one of the video capturing device and the transceiver module and the method further comprises actuating the video capturing device with the power source so as to initiate capturing of video data of the scene by the video capturing device.

38. A method according to claim 35 wherein the monitoring device further comprises a light source operably engaged with the transceiver module and the method further comprises actuating the light source so as to illuminate the scene.

39. A method according to claim 35 wherein the video capturing device is configured to be at least one of automatically focused and manually focused in response to a focus command from the remotely disposed station received via the transceiver module and the method further comprises focusing the video capturing device with respect to the scene.

40. A method according to claim 35 wherein the monitoring device further comprises a motion sensor operably engaged with the video capturing device and the method further comprises actuating the video capturing device upon detection by the motion sensor of a motion in the scene so as to initiate capturing of video data of the scene by the video capturing device.

41. A method according to claim 35 wherein the monitoring device further comprises an audio sensor operably engaged with the transceiver module and configured to capture audio data from the scene and the method further comprises receiving audio data of the scene at the remotely disposed station from the audio sensor, via the transceiver module, so as to facilitate remote aural monitoring of the scene.

42. A method according to claim 35 wherein the monitoring device further comprises a chemical sensor operably engaged with the transceiver module and configured to capture chemical composition data from the scene and the method further comprises receiving chemical composition data of the scene at the remotely disposed station from the chemical sensor, via the transceiver module, so as to facilitate remote chemical monitoring of the scene.

43. A method according to claim 35 wherein the monitoring device further comprises a self-destruction device operably engaged with the transceiver module and configured to be at least one of automatically activated and manually activated in response to a destruct command from the remotely disposed station received via the transceiver module and the method further comprises destroying the monitoring device by activating the self-destruction device.

44. A method according to claim 35 wherein the monitoring device further comprises a gimbal mechanism operably engaged between the video capturing device and the housing and configured to at least one of pan, tilt, and rotate the video capturing device and the method further comprises panning and tilting the video capturing device with respect to the scene.

45. A method according to claim 44 wherein the gimbal mechanism is further configured to be manually actuated in response to a movement command from the remotely disposed station received via the transceiver module and the method further comprises actuating the gimbal mechanism from the remotely disposed station, via the transceiver module, so as to pan and tilt the video capturing device with respect to the scene.

46. A method according to claim 44 wherein the monitoring device further comprises a motion sensor operably engaged with the gimbal mechanism and the method further comprises actuating the gimbal mechanism so as to pan and tilt the video capturing device in response to the motion detector detecting a motion in the scene to thereby initiate capturing of video data by the video capturing device from where the motion is detected in the scene.

47. A method according to claim 35 wherein the monitoring device further comprises a plurality of video capturing devices operably engaging the transceiver module, with each video capturing device being configured to capture video data over an angular field of view, and disposed within the housing so as to capture video data over a 360 degree field of view about the housing and the method further comprises selectively actuating one of the video capturing devices so as to capture video data of the scene within the field of view of the actuated video capturing device.

48. A method according to claim 47 further comprising substantially simultaneously actuating the plurality of video capturing devices so as to capture video data of the scene over a 360 degree field of view about the housing.

49. A method according to claim 47 further comprising sequentially actuating the video capturing devices so as to capture video data of the scene over a continuous field of view scan about the housing.

50. A method according to claim 35 wherein the monitoring device further comprises an antenna operably engaged with the transceiver module and establishing a wireless communication link further comprises establishing a wireless communication link with the transceiver module of the monitoring device via the antenna.

51. A method according to claim 35 wherein the monitoring device further comprises a spatial orientation device operably engaged with the video capturing device and the method further comprises associating a spatial orientation with the captured video data to thereby spatially orient the scene with respect to the video capturing device.

52. A method according to claim 51 wherein associating a spatial orientation with the captured video data further comprises determining the spatial orientation with at least one of a Global Positioning System (GPS) device and a compass device.

53. A method according to claim 51 wherein associating a spatial orientation with the captured video data further comprises associating at least one of geodetic data regarding the housing and a compass heading of the scene, with respect to the housing, with the captured video data.

54. A method according to claim 51 wherein associating a spatial orientation with the captured video data further comprises associating at least one of a position, a degree heading with respect to a compass, and a compass heading with the captured video data.

55. A method according to claim 35 further comprising associating a cross-hair indicator with the captured video data, the cross-hair indicator being provided by a cross-hair generator operably engaged with the video capturing device, to thereby orient the scene with respect to the video capturing device.

56. A method according to claim 35 further comprising associating a distance of an object within the scene, from the housing, with the captured video data, the distance being determined with a range-determining device operably engaged with the video capturing device.

57. A deployable monitoring device comprising:
a self-righting and at least partially arcuate housing configured to be deployed to a deployment medium, the housing being further configured to self-right upon direct engagement with the deployment medium; and
a video capturing device operably engaged with the self-righting housing and configured to capture an image external to the self-righting housing.

58. A method of remotely viewing an image, said method comprising:
deploying a monitoring device to a deployment medium, the monitoring device comprising a video capturing device and a transceiver module operably engaged with a self-righting and at least partially arcuate housing, the housing being configured to self-right upon direct engagement with the deployment medium; and
receiving an image of a scene external to the self-righting housing, the image being captured by the video capturing device, at a station remotely disposed with respect to the housing, via the transceiver module.

* * * * *